April 7, 1964   J. W. HENNEMAN ETAL   3,127,891
FLUID CONTROL
Filed Sept. 4, 1959
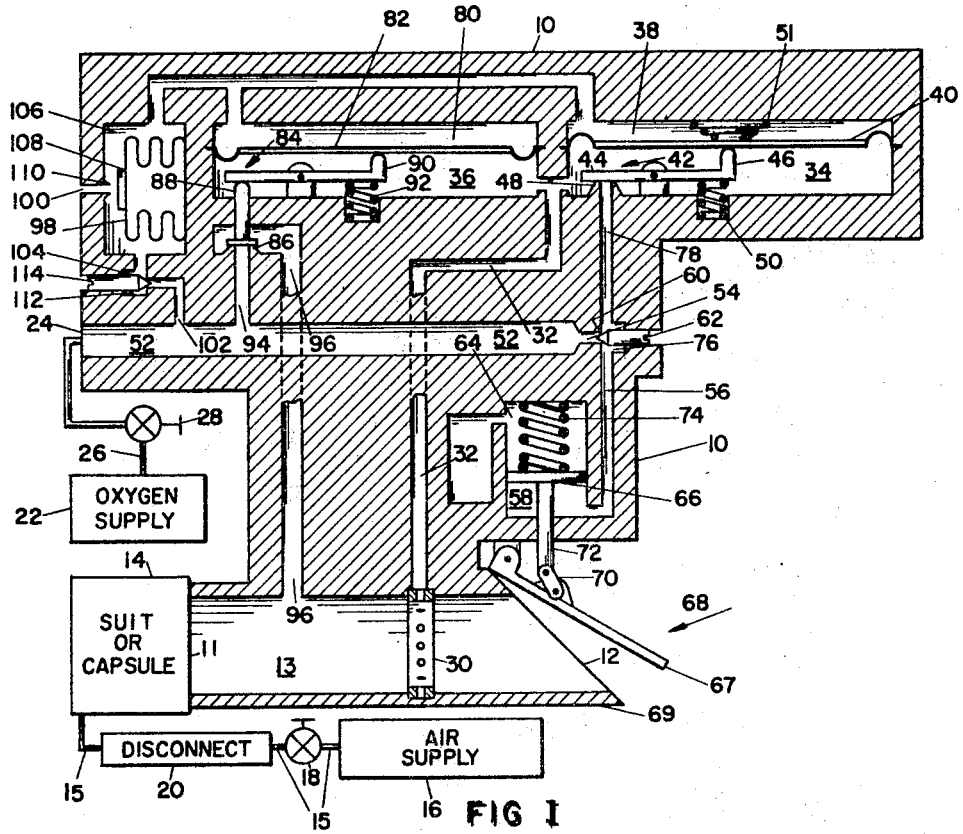
FIG I
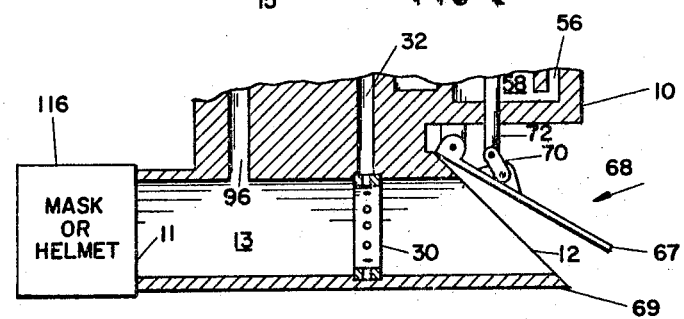
FIG II
INVENTORS
JOHN W. HENNEMAN
ALAN C. TRACY
BY *Roger W. Nolan Jr*
ATTORNEY United States Patent Office 3,127,891
Patented Apr. 7, 1964

3,127,891
FLUID CONTROL
John W. Henneman, Rock Island, Ill., and Alan C. Tracy, Davenport, Iowa, assignors to The Bendix Corporation, a corporation of Delaware
Filed Sept. 4, 1959, Ser. No. 838,177
2 Claims. (Cl. 128—144)

This invention relates to a fluid control regulator and more particularly to the exhaust valve portion of the regulator suitable for use with an aviator's suit, mask, or helmet.

The invention has as one of its objects the provision of an exhaust valve which may be used with an aviator's pressure-demand oxygen regulator or as an aviator's pressure suit regulator.

The physiological demands of the human body require that a person must have a certain external pressure acting on his body at all times and that a person must breathe a certain partial pressure of oxygen. An aviator flying at high altitude must have pressure protection for his body when he is subjected to atmospheric pressures below 3.4 p.s.i.a. (pounds per square inch absolute). A pressure of 3.4 p.s.i.a. is equivalent to the atmospheric pressure at 35,000 feet altitude. This pressure is generally referred to as the critical pressure. In breathing air the partial pressure of oxygen which should be supplied to the aviator at all times is approximately 3.4 p.s.i.a.

Another object of the invention is to provide an exhaust valve which will maintain the minimum pressure which is the physiologically required partial pressure of oxygen to the aviator's breathing apparatus when the valve is used as a breathing valve.

A further object of the invention is to provide a fluid control regulator in which the fluid flowing through the regulator is substantially unrestricted by the flow control elements of the regulator.

A still further object of the invention is the provision of an exhaust valve which has a high sealing force but which force does not affect the initial opening of the valve.

A still further object of the invention is to provide a fluid control regulator which is small, light weight, and relatively inexpensive.

Certain of these objects are realized by the provision of an exhaust valve associated with a flow passage and responsive to pressure variations in a back-up pressure and a control pressure.

The foregoing and other objects and advantages of the invention will appear more fully hereinafter from a consideration of the detailed description which follows; taken together with the accompanying drawing wherein an embodiment of the invention is illustrated. It is to be expressly understood, however, that the drawing is for the purpose of illustration and description and is not to be construed as defining the limits of the invention.

In the drawing:
FIG. 1 is a schematic drawing of a regulator embodying the invention as applied to an aviator's pressure suit.
FIG. 2 is a schematic drawing of a fragment of the regulator shown in FIG. 1 as applied to an aviator's breathing mask or helmet.

Referring now to the drawing and specifically to FIG. 1, there is shown schematically a fluid control regulator which is connected to a pressure suit of the type worn by an aviator. The regulator has a housing 10 having an inlet port 11 and an outlet port 12 connected by a "straight bore" flow passage 13. An aviator's suit 14 is connected to the inlet 11. Air is supplied to the suit 14 by a suitable air supply 16 of the aircraft which in the present day jet aircraft may advantageously be the engine compressor. The air line 15 between the air supply 16 and suit 14 is advantageously provided with a manual shut off valve 18 and disconnect 20. Disconnect 20, which may be a suitable one of several available types, will prevent decompression of the suit 14 incident to a reversal of air flow upon bailout by the aviator or upon failure of the air supply.

Housing 10 has oxygen supply inlet port 24 for connection to the oxygen supply 22 of the aircraft. Oxygen supply line 26, which connects supply 22 and inlet port 24, is provided with a manual shut off valve 28.

Flow passage 13 is provided with a suitable static pressure pick-up element; advantageously the pick-up element may be in the form of a piezometer ring 30 as shown. Piezometer ring 30 is in direct communication with lower diaphragm chambers 34 and 36 by means of passageway 32. Lower diaphragm chamber 34 is separated from upper diaphragm chamber 38 by means of resilient diaphragm 40. Pilot valve 42 is disposed in lower diaphragm chamber 34 and is responsive to and movable with diaphragm 40. Pilot valve 42 comprises valve head 44, lever arm 46 and valve seat 48. Spring 50 biases lever arm 46 against diaphragm 40 and valve head 44 against valve seat 48. Spring 51 is disposed in upper diaphragm chamber 38 and opposes the bias of spring 50.

Oxygen flowing through inlet 24 goes directly into passageway 52, which passageway terminates in restricted orifice 54. Oxygen from passageway 52 and metered through restricted orifice 54 may flow into piston chamber 58 by means of passageway 56. Restricted orifice 54 is created by means of valve seat 60 and adjustable valve head 62. Piston chamber 58 and pressure chamber 64 are separated by means of piston head 66. Piston actuating pressure is maintained in chamber 58 and supplied from oxygen supply 22 as described above. Piston back-up pressure is maintained in pressure chamber 64 and may be any one of a variety of available pressures, for example, the same pressure as found in flow passage 13, upper diaphragm chamber 38 or advantageously as shown at the ambient pressure. Main valve 68 is connected to piston head 66 by link 70 and piston stem 72 and is movable in response to a difference of pressure across piston head 66, ambient pressure in chamber 64 plus the bias of spring 74 on one side and oxygen pressure in chamber 58 on the other. Main valve 68 may advantageously be of the flapper valve type as shown comprising flapper valve head 67 and valve seat 69.

Lower diaphragm chamber 36 is separated from upper diaphragm chamber 80 by means of resilient diaphragm 82. Pilot valve 84 is disposed in lower diaphragm chamber 36 and is responsive to and movable with diaphragm 82. Pilot valve 84 comprises valve seat 86, valve head 88 and lever arm 90. Spring 92 biases lever arm 90 against diaphragm 82 and valve head 88 against valve seat 86. Oxygen may flow from passageway 52 through passageway 94, past unseated pilot valve 84 and through passageway 96 and into flow passage 13.

The fluid pressure in upper diaphragm chambers 38 and 80 is controlled by evacuated bellows 98 regulating the fluid flow through inlet passage 100. Generally, bellows 98 is constructed such that the inlet passage will close at a pressure equivalent to 35,000 feet altitude and maintain the pressure in bellows chamber 106 at or above 3.4 p.s.i.a., the critical pressure. Oxygen from passageway 52 flows through passageway 102, restricted passageway 104 and into bellows chamber 106. Bellows chamber 106 is in direct communication with upper diaphragm chambers 38 and 80. Bellows 98 has a valve head 108 connected to its movable end. Inlet passage 100 is in fluid communication with bellows chamber 106 and has one end thereof forming valve seat 110. Restricted passage 104 comprises valve seat 112 and adjustable valve head 114.

Referring now to FIG. 2 there is shown a portion of the fluid control valve shown in FIG. 1 and the connection of an aviator's mask or helmet 116 to the inlet port 11.

In the operation of the fluid control regulator when used in conjunction with an aviator's suit as shown in FIG. 1, inlet port 11 of the regulator is connected to the outlet of the aviator's suit 14. Manual valves 18 and 28 are opened; and air will flow through the suit 14 and passageway 13 and oxygen will flow into passageway 52.

At ambient pressures above 3.4 p.s.i.a., the pressure equivalent for approximately 35,000 feet altitude, the operation of the regulator is as follows: Main valve 68 is closed, pilot valve 42 is open, and pilot valve 84 is closed. Suit air, flowing into passageway 13, builds up a fluid pressure whose static pressure is sensed by piezometer ring 30 and transmitted to lower diaphragm chambers 34 and 36. Upper diaphragm chambers 38 and 80 are at the ambient pressure, inlet port 100 is open to the ambient air. Fluid pressure in passageway 13, and thus in chambers 34 and 36, will continue to build up until the pressure in lower diaphragm chamber 34 plus the pressure of spring 50 acting on one side of the diaphragm 40 overcomes the fluid pressure in upper diaphragm chamber 38 plus the pressure of spring 51 acting on the second side of diaphragm 40 thereby moving pilot valve 42 to a substantially closed position. Oxygen in passageway 52 will now flow through restricted orifice 54, passageway 56 and into piston chamber 58. Oxygen pressure, the actuating pressure will build up in chamber 58 until the fluid pressure overcomes the back-up pressure in chamber 64 plus the force of spring 74 acting on piston head 66, which pressure differential will move piston head 66 and its associated valve 68 to an open position. Therefore the actuating pressure in chamber 58 (controlled by pilot valve 42 which is movable by diaphragm 40) is proportional to the difference between a pressure, pressure in chamber 38, inversely variable with altitude but never less than the critical pressure and the current static pressure in flow passage 13, the pressure in chamber 34. The degree in which valve 68 is opened controls the flow through suit 14 and passageway 13 and therefore the pressure in suit 14. The air flowing through suit 14 and passageway 13, and thus the fluid pressure in the suit 14, is a function of the suit pressure and the ambient pressure acting across diaphragm 40.

Pilot valve 84 will remain closed until malfunction in the system or bail-out of the aviator occurs. Pilot valve 84 remains in the closed position as long as the fluid pressure in lower diaphragm chamber 36 plus the pressure of spring 92 acting on one side of diaphragm 82 is greater than the fluid pressure in upper diaphragm chamber 80 acting on diaphragm 82.

At ambient pressures below 3.4 p.s.i.a., the operation of the regulator is as follows: Oxygen from passageway 52 will flow through passageway 102, restricted orifice 104 and into bellows chamber 106. Bellows 98 will move valve head 108 towards valve seat 110 to a substantially closed position thereby maintaining the pressure in bellows chamber 106 at the preset critical pressure, generally 3.4 p.s.i.a.

The pressure in the upper diaphragm chambers 38 and 80 is the same as in bellows chamber 106 which for all altitude above 35,000 feet is constant. Pilot valves 42 and 84 will operate in the manner described above. Therefore, the air flowing through suit 14 and passageway 13 and thus the fluid pressure in suit 14 will remain substantially constant.

Upon bail-out or a failure of the air supply, the disconnect 20 will shut off supply line 15 and operation of the fluid control regulator is as follows: The pressure drop created in flow passage 13 is picked up by piezometer ring 30 and a pressure drop occurs in lower diaphragm chambers 34 and 36. Pilot valve 42 opens wider and valve 68 moves to close. Pilot valve 84 opens and oxygen flows from passageway 52, through passageway 94, past valve seat 86, and through passageway 96 into flow passage 13 and suit 14. The pressure in suit 14 and passage 13 will rise to the correct pressure, valve 68 opens only to the degree to meter out excessive pressure in flow passage 13.

In operation of the fluid control regulator when used in connection with an aviator's mask or helmet 116 as shown in FIG. 2, inlet port 11 of the valve is connected to the oxygen inlet of the aviator's mask or helmet 116. Manual valve 28 is opened and oxygen will pass through inlet 24 and into passageway 52. The regulator will operate as a pressure-demand oxygen regulator.

At ambient pressures above 3.4 p.s.i.a., the operation is as follows: Upon inhalation of the user the pressure drop in flow passage 13 is picked up by piezometer ring 30 and by means of passageway 32 a decrease in pressure occurs in lower diaphragm chambers 34 and 36. The pressure differential created across diaphragm 40 will move pilot valve 42 to open and fluid will flow from piston chamber 58. Piston 66 will move and its associated valve 68 will close. The pressure differential across diaphragm 82 will cause pilot valve 84 to open and allow oxygen to flow from passageway 52, through passageway 94, past valve seat 86 and through passageway 96 to flow passage 13 and the aviator's mask or helmet 116. Upon exhalation, exhaust pressure builds up in passageway 13 which pressure is picked up by piezometer ring 30 and transmitted through passageway 32 to lower diaphragm chambers 34 and 36. The pressure differentials across diaphragms 40 and 82 move pilot valves 42 and 84 to close. Oxygen flowing from passageway 52, through restricted orifice 54, passageway 56 and into piston chamber 58 will build up in chamber 58 and overcome the back-up in chamber 64 and the force of spring 74 on piston head 66 and move piston head 66 and open its associated valve 68. Exhaust gas will now flow out outlet 12 past main valve 68.

At ambient pressures below 3.4 p.s.i.a., operation is as follows: The fluid pressure in upper diaphragm chambers 38 and 80 will be maintained at approximately 3.4 p.s.i.a. The operation of the bellows 98 to maintain this pressure has been previously explained. The pressure in upper diaphragm chambers 38 and 80 will always be equal to or greater than the ambient pressure. Thus the oxygen supplied to the aviator's mask or helmet upon demand will always be at the same pressure as is present in upper diaphragm chambers 38 and 80.

While the fluid control regulators as shown in the drawing are of the construction shown and described, it is understood that the present invention is not limited to any particular form or construction. It is within the spirit of the present invention that the fluid control regulator is equally applicable to aviators' suits as well as capsules. Moreover, other changes and modifications of the novel flow control regulator may be made by those skilled in the art without departing from the scope of the present invention.

We claim:

1. A two-stage pilot operated exhaust valve for regulating fluid pressure at not less than the physiological critical pressure comprising: an exhaust passage; a first stage flow control valve comprising valve means for varying the exhaust passage outlet, a fluid chamber, an internal movable piston disposed in the interior of said fluid chamber dividing said chamber into two chambers and movable in response to variation in the pressure differential in the chambers, a member connecting said valve means and said internal movable piston, means arranged to maintain a back-up pressure in one of said chambers; a second stage pilot valve means arranged to maintain an actuating pressure in the second of said chambers comprising a restricted passage means in fluid communication with said second chamber for metering a pressurized fluid through said passage and passing said fluid to said second chamber, means for relieving said actuating pressure comprising a pressure chamber, a resilient member disposed across the interior of said pressure chamber dividing said chamber into two chambers, means arranged to maintain the current static pressure in said flow passage in one of said chambers, means arranged to provide a pressure inversely variable with altitude but never less than said critical pressure in the other of said chambers, and valve means responsive to the movement of said resilient member for venting said actuating pressure from said restricted passage.

2. A two-stage pilot operated valve for regulating fluid pressure at not less than the physiological critical pressure comprising: a flow passage; a first stage flow control valve comprising valve means for varying the flow passage opening, a fluid chamber, an internal movable member disposed across the interior of said chamber dividing said chamber into two chambers and movable in response to variations in the pressure differential in the chambers, a member connecting said valve means and said internal movable member, means arranged to maintain a back-up pressure in one of said chambers; a second stage pilot valve means arranged to maintain an actuating pressure in the second of said chambers comprising a restricted passage in fluid communication with said second chamber, a pressure chamber, a differential pressure responsive movable member disposed across the interior of said chamber dividing said chamber into two pressure chambers, means arranged to maintain the current static pressure in said flow passage in one of said pressure chambers, means arranged to provide a pressure inversely variable with altitude but never less than said critical pressure in the other of said pressure chambers, and valve means responsive to the movement of said movable member for venting said actuating pressure.

References Cited in the file of this patent

UNITED STATES PATENTS

| | | |
|---|---|---|
| 2,755,799 | Marty | July 25, 1956 |
| 2,867,227 | Meidenbauer | Jan. 6, 1959 |
| 2,929,377 | Cummins | Mar. 22, 1960 |

FOREIGN PATENTS

| | | |
|---|---|---|
| 1,172,206 | France | Oct. 13, 1958 |